United States Patent [19]

Tsuji et al.

[11] 4,243,484
[45] Jan. 6, 1981

[54] METHOD AND APPARATUS FOR USE TO EXCHANGE O-RING INTERPOSED BETWEEN IN-CORE HOUSING AND IN-CORE FLANGE IN NUCLEAR REACTOR

[75] Inventors: Teruaki Tsuji; Shigeru Watanabe, both of Yokohama, Japan

[73] Assignee: Tokyo Shibaura Denki Kabushiki Kaisha, Kanagawa, Japan

[21] Appl. No.: 964,667

[22] Filed: Nov. 29, 1978

[30] Foreign Application Priority Data

Dec. 5, 1977 [JP] Japan ............... 52/145893

[51] Int. Cl.² ............................................. G21C 19/00
[52] U.S. Cl. .................................. 176/30; 176/19 R; 176/87
[58] Field of Search ............... 176/19 R, 30, 87

[56] References Cited

U.S. PATENT DOCUMENTS

| | | | |
|---|---|---|---|
| 3,179,266 | 4/1965 | Lemesle et al. | 176/30 |
| 3,183,162 | 5/1965 | Chemin et al. | 176/30 |
| 3,206,367 | 9/1965 | Peuchmaur et al. | 176/30 |
| 3,253,995 | 5/1966 | Antonsen et al. | 176/30 |
| 3,567,576 | 3/1971 | Issac | 176/30 |
| 3,567,577 | 3/1971 | Brooks | 176/30 |
| 3,567,578 | 3/1971 | Issac | 176/30 |
| 3,567,579 | 3/1971 | Hubler et al. | 176/30 |
| 3,567,580 | 3/1971 | Nakagawa et al. | 176/30 |

*Primary Examiner*—S. A. Cangialosi
*Attorney, Agent, or Firm*—Stevens, Davis, Miller & Mosher

[57] ABSTRACT

This invention concerns a method and apparatus for use to exchange an O-ring interposed between an in-core housing disposed at the lower end of a guide tube for an in-core monitor for monitoring the operation of a nuclear reactor and an in-core flange attached to the housing. The apparatus comprises a drain system adapted to be connected to the lower end of the flange for draining reactor water, a split cylindrical guide member adapted to be suspended from an upper grid located in a pressure vessel after removing the in-core monitor, an operating mechanism to be inserted into the guide member, the operating member being hung down from a platform of the reactor, and a tubular repairing tool secured to the lower portion of the operating mechanism, the repairing tool being provided with a valve member which is to be water-tightly engaged with a valve seat formed for the housing when the operating mechanism is lowered into the guide member.

5 Claims, 6 Drawing Figures

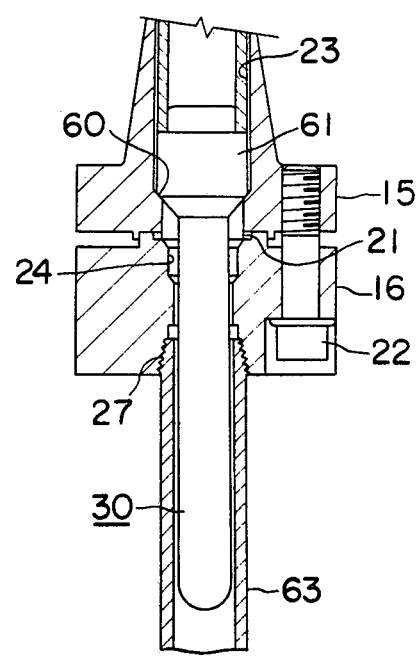
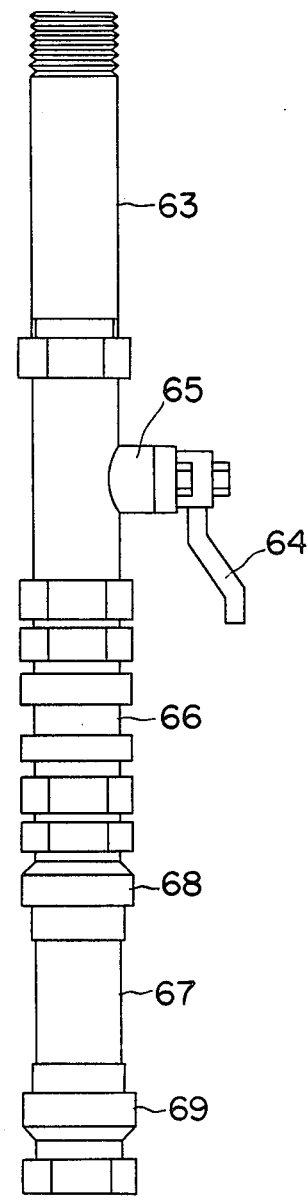

METHOD AND APPARATUS FOR USE TO EXCHANGE O-RING INTERPOSED BETWEEN IN-CORE HOUSING AND IN-CORE FLANGE IN NUCLEAR REACTOR

BACKGROUND OF THE INVENTION

This invention relates to apparatus for and a method of exchanging an O-ring interposed between an in-core housing located at the lower end of a guide tube of an in-core monitor and an in-core flange attached to the in-core housing of a boiling water reactor (BWR) at the time of exchanging the in-core monitor.

FIG. 1 shows a usual BWR 5, in which a platform 2 used for loading and unloading a fuel assembly is mounted on the uppermost floor 1 of the reactor and main and auxiliary winches, not shown, are mounted on the platform 2 which is movable on the floor 1 by wheels 3. A pressure vessel 6 is disposed in the reactor 5 surrounded by a concrete shield 4 and water 7 fills the reactor and the vessel 6 (hereinbelow called reactor water 7). A steam drier 8 and a steam separator 9 are located at the upper portion of the pressure vessel 6. An upper grid (or top guide) 10 and a core supporting plate (or lower grid) 11 are arranged below the steam separator 9 with a predetermined spacing therebetween. The steam drier 8 and the steam separator 9 can be removed when an in-core monitor 12 is to be exchanged, and then, members located below the upper grid 10 can be observed through the reactor water 7 by an operator standing on the platform 2.

The upper end of the in-core monitor 12 engages the grid 10, and the monitor 12 extends downwardly through a guide tube 13 suspended from the supporting plate 11 and through the bottom cover 14 of the pressure vessel 6 to reach an in-core flange 16 which is secured by bolts 22 to an in-core housing 15 connected to the lower end of the guide tube 13 as shown in FIG. 2. The structure below the bottom cover 14 of the pressure vessel 6 is generally called a pedestal 17 and within the pedestal is located a platform 18 for exchanging a control rod driving mechanism. A groove 20 for draining the drain in the pedestal is formed at the bottom 19 of the pedestal.

FIG. 2 shows in detail the housing 15 and the flange 16 of the conventional BWR, in which a metal O-ring 21 is interposed between the housing 15 and the flange 16. The lower end of the in-core monitor is received in coaxial openings 23 and 24 of the housing 15 and the flange 16, respectively, and the tapered valve member 26 of the monitor 12 rests on the corresponding tapered valve seat 25 in the opening 24 so as to tightly press the valve member 26 against the valve seat 25 by the pressure of the reactor water 7, thereby preventing the leakage of the reactor water 7 from the opening 24. Screw threads 27 are formed on the inside surface of the lower portion of the opening 24 and an adapter 28 is screwed thereinto.

The inspection and the repair of the conventional in-core monitor 12 have been performed by using spring reel means, not shown, located on the bottom floor 19 of the pedestal 17. Therefore, workers had to work for a long time within the pedestal for inspecting or repairing the monitor, and this work is very dangerous for workers because they are exposed to radiations. Furthermore, in order to exchange the O-ring 21, it was required to remove the in-core monitor and the flange 16, but the reactor water 7 is likely to leak from the opening 23 when the monitor 12 is removed, so that it was necessary to provide a packing made of an elastic material for the opening 23 to prevent the leakage of the reactor water 7.

SUMMARY OF THE INVENTION

Accordingly, an object of this invention is to obviate the defects of the prior art described above and to provide an improved method and apparatus for exchanging an O-ring interposed between an in-core housing and an in-core flange in a nuclear reactor when an in-core monitor is removed.

According to this invention, in one aspect, there is provided apparatus for use to exchange an O-ring interposed between an in-core housing disposed at the lower end of a guide tube for an in-core monitor used for monitoring the operation of a nuclear reactor and an in-core flange attached to the housing, the in-core monitor being suspended from an upper grid disposed in a reactor pressure vessel towards the flange through a lower grid and the guide tube attached to the lower grid, and the apparatus comprises a drain system adapted to be connected to the lower end of the flange for draining reactor water, a split cylindrical guide member adapted to be suspended from the upper grid after the in-core monitor has been removed from the upper grid, an operating mechanism to be inserted into the guide member, and tubular repairing tool secured to the lower portion of the operating mechanism to extend into the guide member therealong as the operating mechanism is lowered.

In the other aspect, there is provided a method of exchanging an O-ring interposed between an in-core housing disposed at the lower end of a guide tube for an in-core monitor used for monitoring the operation of a nuclear reactor and an in-core flange attached to the housing when the in-core monitor is removed and the method comprises the steps of connecting a drain system to the lower end of the flange for draining reactor water, hanging down a split cylindrical guide member from a platform on the reactor and securing it to an upper grid located in a reactor pressure vessel, hanging down an operating mechanism including a tubular repairing tool from the platform so as to extend into the guide member, lowering the repairing tool along the surface of the guide member so as to guide the lower end of the repairing tool into the guide tube and so as to cause a valve member provided at the lower portion of the repairing tool to water-tightly engage with the valve seat formed for the housing, and removing the flange from the housing, thereby facilitating exchange of the O-ring interposed between the housing and the flange.

BRIEF DESCRIPTION OF THE DRAWINGS

In the accompanying drawings:

FIG. 5 is a detailed longitudinal sectional view of an in-core housing and an in-core flange shown in FIG. 4; and FIG. 6 shows a front view of a drain system connected to the in-core flange.

DESCRIPTION OF THE PREFERRED EMBODIMENT

Figure 1:
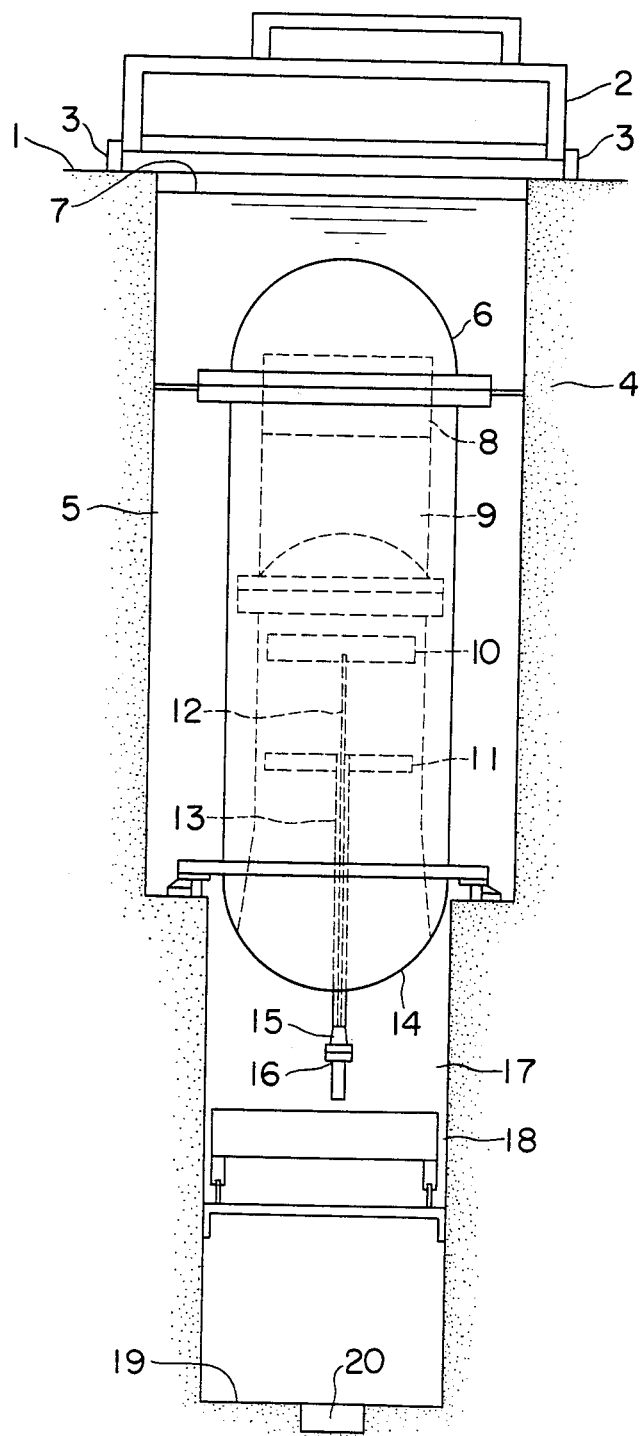
FIG. 1 is a schematic elevational view showing a conventional boiling water reactor (BWR)
Figure 2:
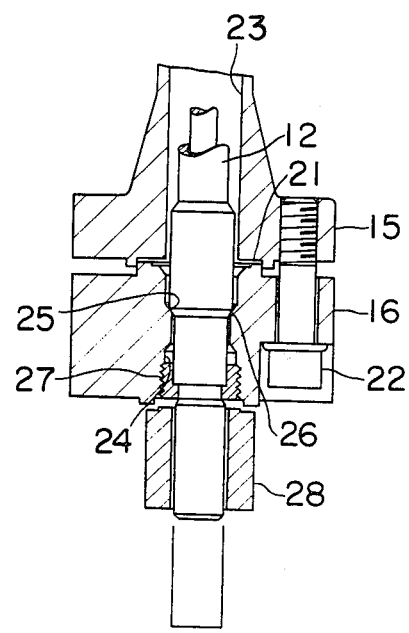
FIG. 2 shows a longitudinal sectional view of an in-core housing and an in-core flange used in a conventional BWR.
Figure 3:
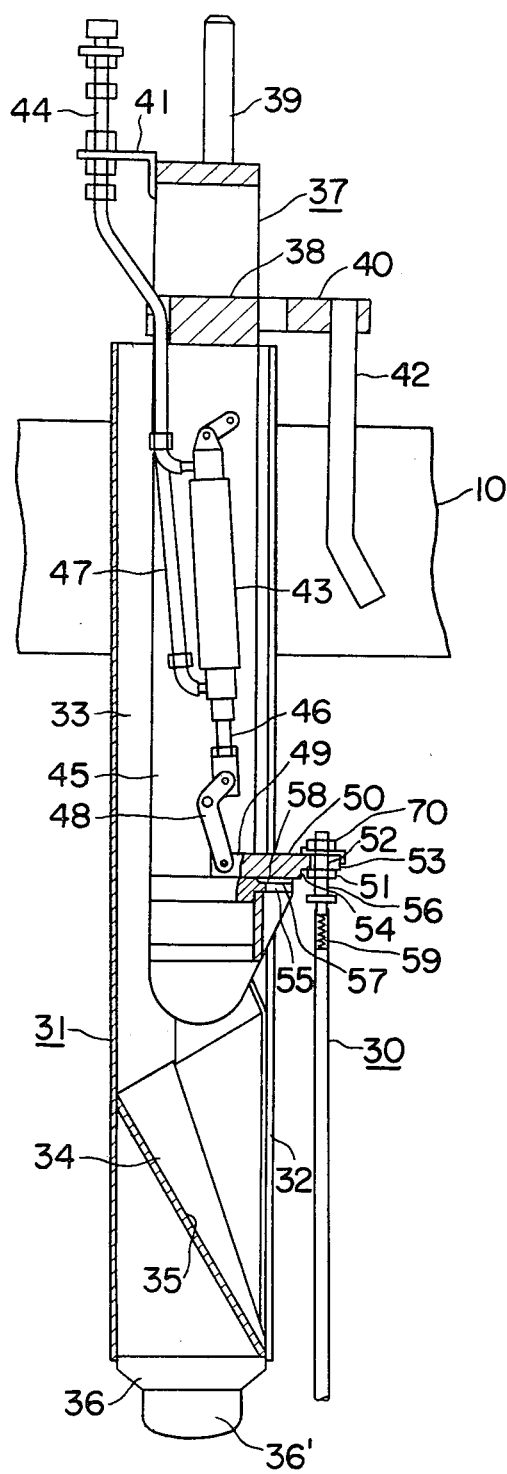
FIG. 3 shows a longitudinal sectional view of an operating mechanism of the apparatus according to this invention.

An elongated tubular repairing tool 30, shown in FIG. 3, used for carrying out this invention is secured to the portion utilized for securing the monitor by using a guide member 31 having square cross section after the removal of the in-core monitor. The guide member 31 has a square cross section with one edge cut by a slit 32 to form a split cylinder 33. Inverted L-shaped hooks, not shown, to be engaged with the upper grid 10 are attached to the side surface of the split cylinder 33.

A pair of inclined plates 34 are disposed at the bottom ends of the split cylinder 33 so as to cover the lower opening of the split cylinder, and the inclined plates 34 form a guide groove 35 having a V-shaped cross section, the righthand ends of the plates 34 descending towards the slit 32. A nose piece 36 is fitted in the lower opening of the guide tube 31 to be coaxially with the split cylinder 33, and the nose piece 36 has a circular truncated conical lower end 36' so as to tightly engage the conical seat, not shown, of the supporting plate 11. Suspension hooks for passing a rope to hang the guide member 31 are attached to the upper end of the split cylinder.

When it is required to secure the repairing tool 30, an operating mechanism 37 is first inserted into the guide member 31. The operating mechanism 37 is provided with a horizontal base plate 38, having one end to which a pair of inverted L-shaped hooks, not shown, are secured, and a hanging rod 39 is embedded in the central portion of the upper surface of the plate 38 for hanging a rope, the upper end of which being wound on the drum of a winch, not shown, mounted on the platform 2. The operating mechanism 37 is elevated within the reactor pressure vessel by driving the winch through the rope.

A guide rod holding member 40 and an air pipe holder 41 are mounted on the side surfaces of the base plate 38 on both sides of the hanging rod 39, respectively. The guide rod holding member 40 extends horizontally from the base plate as shown in FIG. 3 and a circular guide rod 42 having a bent lower end is suspended from the free end of the hanging member 40. The upper grid 10 is divided into a number of square compartments for accommodating fuel rods. The guide rod 42 engages a corner of a compartment of the grid 10, which is diagonally opposing the corresponding corner of another compartment into which the operating mechanism is now to be inserted, thus accurately securing and positioning the mechanism 37. The air pipe holder 41 takes form of a U-shaped frame so as to hold an air pipe 44 which supplies air to a pneumatic piston-cylinder assembly 43.

A pair of parallel frame plates 45 (only one of which is illustrated in FIG. 3) are secured to the lower surface of the base plate 38 and extend downwardly therefrom. The pneumatic piston-cylinder assembly 43 is disposed in the space formed between the two plates 45, and the head of the assembly 43 is swingably spported by the plate 45. A flexible air pipe 47 for operating the piston rod 46 of the assembly 43 is connected to one end of the assembly 43 and the other end of pipe 47 is connected to a source of pressurized air, not shown, through the air supply pipe 44 and an external air pipe, not shown.

An L-shaped operating lever 48 is pivotally connected to the lower end of the piston rod, and a movable pawl 50 is connected to the lower end of the lever 48 through an attachment block 49. The free end of the pawl 50 extending outwardly through the slit 32 is provided with a U-shaped groove 53 for engaging the neck portion 52 of the repairing tool 30 at a point above a collar 51 thereof. A circular recess 54, having a diameter slightly larger than that of the collar 51, is formed on that free end below the U-shaped groove 53.

Figure 4:
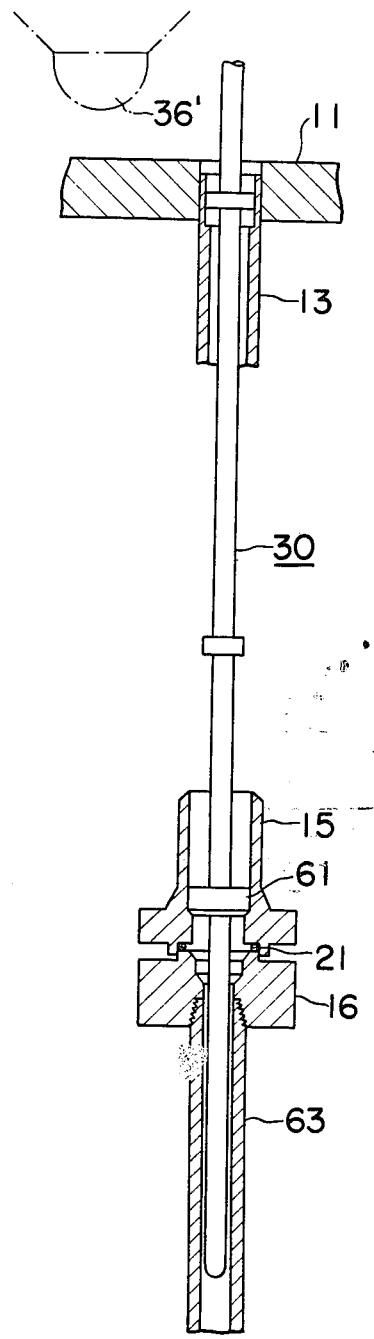
FIG. 4 is a longitudinal sectional view showing the lower portion of a repairing tool of the operating mechanism shown in FIG. 3.

Below the movable pawl 50 there is provided a stationary pawl 55 slightly spaced from the movable pawl 50 so as not to disturb the movement of the pawl 50 which is moved by the pneumatic piston-cylinder assembly 43. The upper surface of the stationary pawl 55 surves as a guide surface for the horizontal movement of the movable pawl 50. A U-shaped groove 57 is formed at one end of the stationary pawl 55 so as to engage a portion of the shank 56 of the repairing tool 30 when the movable pawl 50 is moved leftwardly in FIG. 3, and a U-shaped groove 58 having a diameter slightly larger than that of the collar 51 is formed on the upper surface of the U-shaped groove 57. Since a compression coil spring 59 is housed in the repairing tool 30 at a point below the collar 51, the head of the tool can easily engage a recess, not shown, formed to the lower surface of the crossing portion of the compartments of the grid 10. The lower end of the repairing tool 30 further extends downwardly as shown in FIG. 4 beyond the in-core flange secured to the housing 15 by the bolts 22 shown in FIG. 5. As is apparent from FIGS. 4 and 5, the O-ring 21 is interposed between the housing 15 and the flange 16, and the repairing tool 30 passes through the openings 23 and 24 which are coaxial with the housing and the flange. The lower end of the valve member 61 of the repairing tool 30 is tapered so as to tightly engage the valve seat 60 located in the opening 23 under the static pressure of the reactor water 7, thus preventing the leakage of the water 7.

A drain system is connected to the flange 16 by connecting the draining system to the screw threads 27 formed at the lower end of the opening 24. As shown in FIG. 6, the drain system comprises a stainless steel straight pipe 63 provided with screw threads adapted to engage the screw threads 27, a ball valve 65 connected to the straight pipe 63 and provided with a lever 64, a connecting pipe 66 such as a coupling which can be easily connected to the pipe 63, and a transparent tube 67, made of a transparent vinyl hose, one end of which being connected with the connecting pipe 66 and the other end of which being inserted into the groove 20. Male threads are formed on both ends of the straight pipe 63 and female threads are formed on both ends of the ball valve 65. Couplings 68 and 69 respectively provided with male threads are connected to both ends of the transparent tube 67, respectively. The reactor water 7 in the guide tube 13 is speedily and effectively drained by using such a drain system as described above.

A flapper held by a coil spring may be provided for the coupling 69 not only to measure the amount of drain of the reactor water by regulating the opening of the flapper but also to prevent the scattering of the drain. In order to remotely control the ball valve 65, an electromagnetic valve can also be used as the ball valve.

The operations of the operating mechanism 37 and the repairing tool 30 are described hereunder.

The in-core monitor 12 is first removed and the guide member 31 is inserted into the space formed by the removal of the monitor. This guide member 31 is hung down into the space by an operator on the platform 2 by using the winch installed thereon. When the guide member 31 is inserted into the supporting plate 11, guide hooks, not shown, attached to the upper end of the guide member engage the grid 10 thereby accurately positioning the guide member with respect to the grid 10 thus preventing the rotation thereof. Concurrently with this insertion, the nose piece 36 fitted into the lower end of the guide member 31 tightly engages the conical seat, not shown, of the supporting plate 11. A hanging hook, not shown, is utilized for hanging down the guide member by using the rope which is driven by the winch, and after the insertion of the guide member 31, the guide hooks attached to the upper portion of the guide member are tilted horizontally so as not to disturb the insertion of the operating mechanism 37 into the guide member. In a case where the guide hooks are tilted, since the upper edge of the split cylinder is positioned sufficiently above the grid 10, the guide hooks do not contact a fuel bundle or a control rod.

In the next step, the repairing tool 30 is secured to the operating mechanism in the manner that the piston rod 46 of the pneumatic piston-cylinder assembly 43 is retracted so as to advance the movable pawl 50 to the position shown in FIG. 3 and then the collar 51 of the repairing tool 30 is engaged with the circular recess 54 of the pawl 50. When the piston rod 46 of the piston-cylinder assembly 43 is advanced to retract the movable pawl, the collar 51 is held between the pawls 50 and 55. A nut 70 is applied to the threaded upper end of the repairing tool projecting beyond the upper surface of the movable pawl 50, whereby the repairing tool 30 is firmly supported by the pawl 50, the nut 70 and the collar 51.

After securing the repairing tool to the movable pawl 50 of the operating mechanism 37, the repairing tool and the operating mechanism 37 are inserted into the guide member 31 by hanging them by using the rope driven by the winch mounted on the platform 2. Upon insertion of the operating mechanism 37, the repairing tool 30 held by the movable and stationary pawls 50 and 55 is directed to the adjoining corners of the compartments of the grid 10. As the operating mechanism 37 is lowered into the guide member 31, the repairing tool 30 is also lowered along the side surface of the split cylinder 33. The lower end of the tool 30 abuts against the inclined plate 34 and is further lowered along the V-shaped groove 35. Although the lower end of the repairing tool then departs outwardly from the lower edge of the groove 35, the lower shank of the repairing tool still slides along the lower edge of the groove 35 to guide the lower end of the tool 30 into the guide tube 13. Thus, finally, as shown in FIG. 5, the valve member 61 provided at the lower end of the repairing tool is caused to engage the valve seat 60 formed at the opening 23 of the housing 15. At this time, since the valve member 61 is forcibly pressed against the valve seat 60 by the static pressure of the reactor water 7, the reactor water does not leak from the opening 23 even when the flange 16 is detached for removing the O-ring 21. Further, it is necessary to close the ball valve 65 to prevent the leakage before the removal of the flange 16.

The metal O-ring 21 is exchanged after the removal of the in-core flange 16 and thereafter the flange 16 is again secured by the bolt 22 to the housing 15. The ball valve 65 is then closed and the valve member 61 of the repairing tool is raised from the valve seat 60 of the housing 15 to inspect whether there is a leakage of the reactor water 7 or not. Thereafter, the repairing tool 30 is lifted up and placed on the platform 2 in a case where no leakage is detected. A new in-core monitor is attached in substantially the same manner as attaching the repairing tool. Now, the work for exchanging the O-ring 21 is finished.

As is apparent from the foregoing disclosure, according to this invention, since the guide member 31 is hung down from the platform 2 mounted on the reactor by hooking it to the grid 10 and since the operating mechanism 37 including the repairing tool 30 is hung down from the platform and inserted downwardly into the guide tube along the guide member 31 and fitted watertightly to the housing 15, the self-shielding of the repairing tool 30 in the housing will be accomplished. Accordingly, there is no fear of leaking the reactor water even if the flange 16 is removed from the housing 15. Furthermore, since the operation of the operating mechanism 37 can be remotely controlled by operators on the platform 2, the working time of operators in the pedestal 17 is much shortened and the possibility of the radiation exposure to the operators is extremely reduced. The insertion of the repairing tool into the guide tube can be accurately and smoothly performed thereby improving the working capability and the safe working of the operators.

What is claimed is:

1. In apparatus for use to exchange an O-ring interposed between an in-core housing disposed at the lower end of a guide tube for an in-core monitor used for monitoring the operation of a nuclear reactor and an in-core flange attached to said housing, said in-core monitor being suspended from an upper grid disposed in the reactor pressure vessel towards said flange through a lower grid and said guide tube attached to said lower grid, the improvement which comprises a drain system adapted to be connected to the lower end of said flange for draining reactor water, a split cylindrical guide member adapted to be suspended from said upper grid after said in-core monitor has been removed from said upper grid, an operating mechanism to be inserted into said guide member, and a tubular repairing tool secured to the lower portion of said operating mechanism to extend into said guide member therealong as said operating mechanism is lowered, said operating mechanism comprising a base plate, a guide rod attached to said base plate and engaged with said upper grid for positioning said operating mechanism, frame plates attached to the lower surface of said base plate and extending downwardly therefrom into said guide member, a stational pawl attached to said frame plate, a movable pawl, and means secured to said frame plate for moving said movable pawl through a lever to be slidable on said stational pawl, said movable pawl being provided with a groove at its free end for securing the upper shank portion of said repairing tool.

2. The apparatus according to claim 1 wherein said repairing tool includes a compression spring provided at an intermediate portion thereof.

3. The apparatus according to claim 1 wherein said repairing tool is provided with a valve member which water-tightly engages with a valve seat formed at the opening of said housing.

4. In apparatus for use to exchange an O-ring interposed between an in-core housing disposed at the lower end of a guide tube for an in-core monitor used for monitoring the operation of a nuclear reactor and an in-core flange attached to said housing, said in-core monitor being suspended from an upper grid disposed in a reactor pressure vessel towards said flange through a lower grid and said guide tube attached to said lower grid, the improvement which comprises a drain system adapted to be connected to the lower end of said flange for draining reactor water, a split cylindrical guide member adapted to be suspended from said upper grid after said in-core monitor has been removed from said upper grid, an operating mechanism to be inserted into said guide member and a tubular repairing tool secured to the lower portion of said operating mechanism to extend into said guide member therealong as said operating mechanism is lowered, said operating mechanism comprising a base plate, a guide rod attached to one side of said base plate and engaged with said upper grid for fixing and positioning said operating mechanism, an air pipe secured to said base plate through an air pipe holder, frame plates attached to the lower surface of said base plate and extending downwardly therefrom into said guide member, a pneumatic piston-cylinder assembly secured to said frame plate and operated by air supplied from said air pipe, a stationary pawl attached to said frame plate, and a movable pawl connected to the lower end of said pneumatic piston-cylinder assembly through a lever to be slidable on said stationary pawl according to the operation of said piston-cylinder assembly, said movable pawl being provided with a groove at its free end for securing the upper shank of said repairing tool, said repairing tool including a compression spring to the intermediate portion thereof and said repairing tool being provided with a valve member which water-tightly engages with a valve seat formed to the opening of said housing.

5. A method of exchanging an O-ring interposed between an in-core housing disposed at the lower end of a guide tube for an in-core monitor used for monitoring the operation of a nuclear reactor and an in-core flange attached to said housing when said in-core monitor is removed, said method comprising the steps of connecting a drain system to the lower end of said flange for draining reactor water, hanging down a split cylindrical guide member from a platform on the reactor and securing it to an upper grid located in a reactor pressure vessel, hanging down an operating mechanism including a repairing tool from said platform so as to extend into said guide member, lowering said repairing tool along the surface of said guide member so as to guide the lower end of said repairing tool into said guide tube and so as to cause a valve member provided at the lower portion of said repairing tool to water-tightly engage with the valve seat formed for said housing, and removing said flange from said housing, thereby facilitating exchange the O-ring interposed between said housing and said flange.

* * * * *